(12) United States Patent
Goroff et al.

(10) Patent No.: US 8,055,937 B2
(45) Date of Patent: Nov. 8, 2011

(54) HIGH AVAILABILITY AND DISASTER RECOVERY USING VIRTUALIZATION

(75) Inventors: Marc H. Goroff, Livermore, CA (US); Pang-Chieh Chen, Palo Alto, CA (US); Christopher T. Dean, Montara, CA (US); Paul E. Stolorz, Los Altos, CA (US)

(73) Assignee: QuorumLabs, Inc., Fremont, CA (US)

( * ) Notice: Subject to any disclaimer, the term of this patent is extended or adjusted under 35 U.S.C. 154(b) by 0 days.

(21) Appl. No.: 12/645,266

(22) Filed: Dec. 22, 2009

(65) Prior Publication Data

US 2010/0162039 A1    Jun. 24, 2010

Related U.S. Application Data

(60) Provisional application No. 61/139,832, filed on Dec. 22, 2008.

(51) Int. Cl.
*G06F 11/00* (2006.01)
(52) U.S. Cl. ...................................................... 714/6.13
(58) Field of Classification Search .................. 714/3, 6, 714/6.13
See application file for complete search history.

(56) References Cited

U.S. PATENT DOCUMENTS

| | | | |
|---|---|---|---|
| 7,165,186 B1* | 1/2007 | Viswanatham et al. | 714/1 |
| 7,447,939 B1* | 11/2008 | Faulkner et al. | 714/6.13 |
| 7,610,511 B2* | 10/2009 | Fujita et al. | 714/15 |
| 7,720,817 B2* | 5/2010 | Stager et al. | 707/649 |
| 2005/0055603 A1* | 3/2005 | Soran et al. | 714/7 |
| 2006/0282697 A1* | 12/2006 | Sim-Tang | 714/1 |
| 2008/0281879 A1* | 11/2008 | Kawamura | 707/204 |
| 2009/0265706 A1* | 10/2009 | Golosovker et al. | 718/1 |
| 2010/0077250 A1* | 3/2010 | Koh et al. | 714/4 |

OTHER PUBLICATIONS

Avnet Technology Solutions, Data De-Duplication Made Simple taking the Sting out of Exponential Data Growth, accessed Nov. 25, 2009, pp. 1-7.

* cited by examiner

*Primary Examiner* — Scott Baderman
*Assistant Examiner* — Yair Leibovich
(74) *Attorney, Agent, or Firm* — SoCal IP Law Group LLP; Steven C. Sereboff; Jonathan Pearce

(57) ABSTRACT

There is disclosed apparatus and processes which address problems in the area of providing high availability and disaster recovery for computing systems and the data in them. These apparatus and processes can be used to provide high availability and disaster recovery for a computing system to be protected. The protected computing systems may be virtual computing systems.

19 Claims, 7 Drawing Sheets

```
<DeltaManifest> ->              ; JSON array
  '[' <DeltaManifest_Meta>
    { ',' <Volume_Spec> }*
  ']'

<DeltaManifest_Meta> ->         ; JSON object
  '{' <DeltaManifest_Attr> ':' <Attr_Value>
    { ',' <DeltaManifest_Attr> ':' <Attr_Value> }*
  '}'

<Volume_Spec> ->                ; JSON array
  '[' <Volume_Meta>
    { ',' <File_Spec> }*
    { ',' <Dir_Spec> }*
  ']'

<Volume_Meta> ->                ; JSON object
  '{' <Volume_Attr> ':' <Attr_Value>
    { ',' <Volume_Attr> ':' <Attr_Value> }*
  '}'

<DeltaManifest_Attr> -> {
    "ver"              ; version
  | "prev"             ; previous manifest
  | "curr"             ; current manifest
}

<Volume_Attr> -> {
    "vol"              ; volume
  | "prev"             ; previous snapshot time
  | "curr"             ; current snapshot time
  | "items"            ; number of (file/dir) items
}

<Attr_Value> -> {                ; depending on the attr
    string
  | integer
}

<File_Spec> ->                   ; JSON array of 2 objects
  '[' '{' "file" ':' <FileName> '}'   ; object specifying filename
    ',' <State_Spec>             ; object state info
  ']'
```

FIG. 3A

```
<Dir_Spec> ->                      ; JSON array of 1+ objects
 '[' '{' "dir" ':' <DirName> '}'   ; object specifying dirname
    { ',' <State_Spec> }           ; object state info
    { ',' <File_Spec> }*           ; list of files
    { ',' <Dir_Spec> }*            ; list of subdirectories
 ']'

<State_Spec> ->                    ; JSON object
 '{' <State_Attr> ':' <State_Value>   ; 1 or 2 attr-value pairs
    [ ',' <State_Attr> ':' <State_Value> ]
 '}'

<State_Attr> -> {                  ; cannot be empty
    "old"                          ; empty => create
   | "new"                         ; empty => delete
}

<State_Value> ->                   ; JSON object
 '{' "attr" ':' hex_string ','     ; regular/extended attr (including 3 file times)
     "secu" ':' hex_string         ; security
     [ ',' "data" ':' file_path ]  ; optional path to the md5-named data file
     [ ',' "altd" ':' file_path ]  ; optional path to the md5-named alternate data stream
 '}'
```

FIG. 3B

Disk images:

c:\File1
c:\File2
c:\pchen
c:\pchen\dir1
c:\pchen\dir1\File1.1
c:\pchen\dir1\File1.2
c:\pchen\dir2
c:\pchen\dir2\File2.1
c:\pchen\dir2\File2.2
d:\File3

FIG. 4

```
[ { "ver":"1.0",
    "prev":"previous-manifest-name",
    "curr":"current-manifest-name"
  },
  [ { "vol":"c",
      "prev":"previous-snapshot-time",
      "curr":"current-snapshot-time",
      "items":9
    },
    [ { "file":"File1" },
      { "old":<oldFState(c:\File1)>,
        "new":<newFState(c:\File1)>
      }
    ],
    [ { "file":"File2" },
      { "old":<oldFState(c:\File2)>,
        "new":<newFState(c:\File2)>
      }
    ],
    [ { "dir":"pchen" },
      //state object not present indicates no change
      [ { "dir":"dir1" },
        { "old": <oldDState(c:\pchen\dir1)>,
          "new": <newDState(c:\pchen\dir1)>
        },
        [ { "file":"File1.1" },
          { "old":<oldDState(c:\pchen\dir1\File1.1)>,
            "new":<newDState(c:\pchen\dir1\File1.1)>
          }
        ],
        [ { "file":"File1.2" },
          { "old":<oldDState(c:\pchen\dir1\File1.2)>,
            "new":<newDState(c:\pchen\dir1\File1.2)>
          }
        ]
      ], //end of c:\pchen\dir1
```

FIG. 5A

```
    [ { "dir":"dir2" },
      { "old":<oldDState(c:\pchen\dir2)>,
        "new":<newDState(c:\pchen\dir2)>
      },
      [ { "file":"File2.1" },
        { "old":<oldDState(c:\pchen\dir2\File2.1)>,
          "new":<newDState(c:\pchen\dir2\File2.1)>
        }
      ],
      [ { "file":"File2.2" },
        { "old":<oldDState(c:\pchen\dir2\File2.2)>,
          "new":<newDState(c:\pchen\dir2\File2.2)>
        }
      ]
    ] //end of c:\pchen\dir2
  ] //end of c:\pchen
], //end of c:

[ { "vol":"d",
    "prev":"previous-snapshot-time",
    "curr":"current-snapshot-time",
    "items":1
  },
  [ { "file":"File3" },
    { "old":<oldFState(d:\File3)>,
      "new":<newFState(d:\File3)>
    }
  ]
] //end of d:
] //end of delta-manifest
```

FIG. 5B

HIGH AVAILABILITY AND DISASTER RECOVERY USING VIRTUALIZATION

RELATED APPLICATION INFORMATION

This patent claims priority from the following provisional patent application:

Application No. 61/139,832 entitled "High Availability and Disaster Recovery Using Virtualization", filed Dec. 22, 2008, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to high availability and disaster recovery for protected computing systems using virtualization.

DESCRIPTION OF THE DRAWINGS

FIG. 3A and FIG. 3B show an illustrative example of a manifest

FIG. 4 shows a sample manifest.

FIG. 5A and FIG. 5B show a sample delta manifest.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Embodiments of the invention address problems in the area of providing high availability and disaster recovery for computing systems and the data in them.

Embodiments of the invention can be used to provide high availability and disaster recovery for a computing system to be protected. Examples of computing systems to be protected include computing systems running or storing production workloads and clusters or groups of such computing systems. In some embodiments, some or all of the protected computing systems may be virtual computing systems. A protected computing system is generally originally located at a primary production site. Computing systems at multiple primary production sites may be protected by embodiments of this invention.

Embodiments of the invention use virtualization of computing systems to provide high availability and disaster recovery.

Embodiments of the invention are implemented by computing systems configured to provide (1) virtualization infrastructure; (2) a storage repository, which may be either internal or external to the computing system; and (3) a configurable automation engine.

In preferred embodiments, these services are provided by a single computing system. Examples of single computing systems include a special purpose computer, a general purpose computer, a computing system with multiple CPUs, or a cluster of computing systems. In other embodiments, these services could be provided by independent computing systems. A computing system may also provide other services. Among the benefits of providing more than one of these services on a common computing system are ease of implementation and improved efficiency. Such a computing system is referred to as a "platform".

Figure 1:
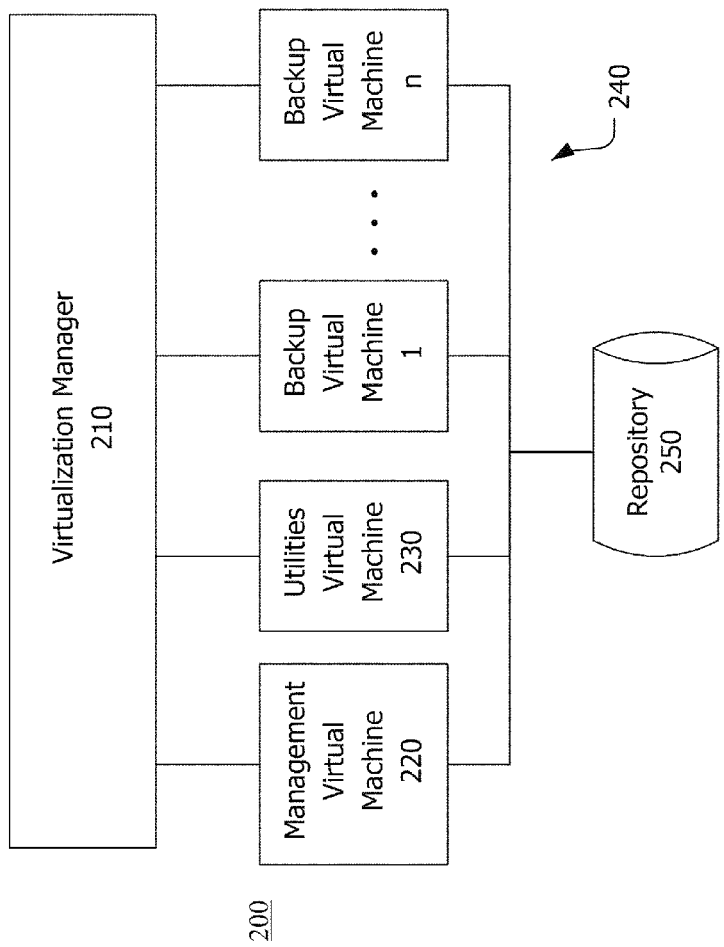
FIG. 1 is a diagram of a computing environment.

Referring now to FIG. 1 there is shown an example of such a platform 200. This is an example of a platform with local storage 250. The platform 200 can represent either a DR platform or an HA platform, depending on its location and connectivity to the computing systems to be protected and the primary production site. In the illustrated embodiment, the functions described above are provided by virtual machines 220, 230, 240 running on the platform 200 and managed by the virtualization manager 210. DR platforms and HA platforms may differ from each other (and from other similar platforms) in the utilities that they have available or that they use. The backup virtual machines 240 are images of protected computing systems. The local storage is the repository 250. The backup virtual machines 240 are images of protected computing systems, as described below.

A computing system may be protected using one such platform. However, a preferred embodiment, which is described in more detail, uses at least two platforms to provide more complete protection. The at least two platforms may, but need not, have identical computing systems. In one embodiment, they contain substantially the same subsystems and capabilities. Given the different roles and performance requirements of the platforms as described below, in some embodiments the platforms have different hardware and software configurations as appropriate for their tasks.

In preferred embodiments, the at least two platforms are used and configured in such a way as to provide improved protection and higher availability of production machines. In these embodiments, one proper subset of the platforms, the High Availability (HA) platforms, are connected to a set of protected computing systems. The connections are preferably via high speed networks, such as a local area network (LAN) connections. The protected computing systems may be at one or more primary production sites. A primary production site is a geographic location, such as a room or building, which contains protected computing systems.

A second proper subset of the platforms, having no platforms in common with the HA platforms, includes Disaster Recover (DR) platforms. The DR platforms are preferably installed at locations geographically distinct and remote from both the HA platforms and the protected computing systems, but need not be. In a preferred embodiment, the DR platforms connect to the HA platforms via wide area network (WAN) connections, but they may connect in any fashion to the HA platforms.

Figure 2:
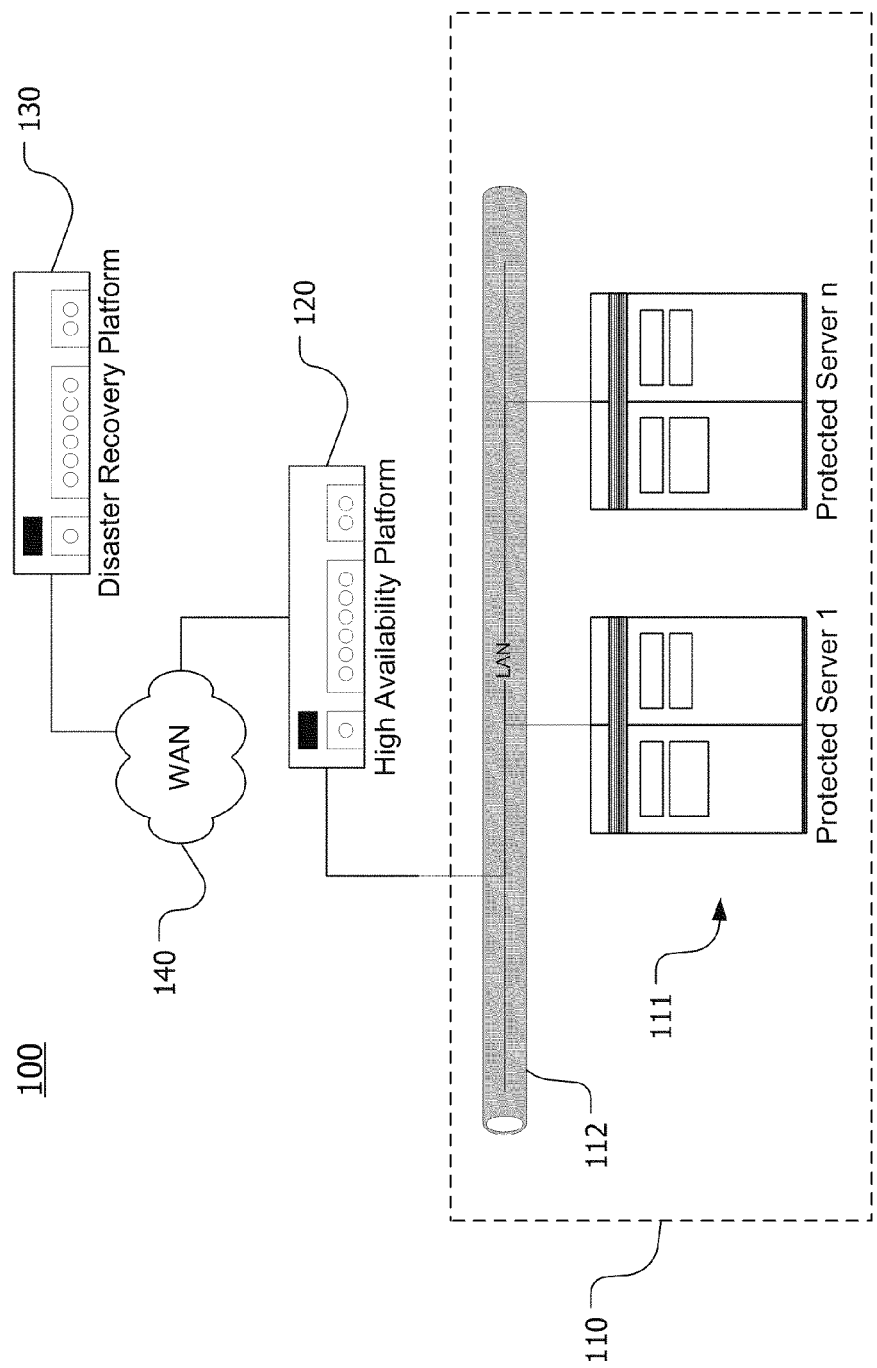
FIG. 2 is a block diagram of a platform for high availability and disaster recovery.

Referring now to FIG. 2, there is shown the high level components of an embodiment of the invention. FIG. 2 shows Protected Servers 1 . . . n 111, all at the same primary production site 110, as the protected computing systems. Platform 120 is an HA platform and platform 130 is a DR platform.

Platforms preferably include a method of replicating the content of protected computing systems, which may be either physical or virtual machines. Preferably, replication is done with minimal impact on the performance of the protected computing systems. A replication of the contents of a computing system can be an image or snapshot.

In some embodiments, replication is facilitated by a software agent resident on the protected computing systems. Also, in some embodiments replication may use mechanisms provided by the operating system or hardware (real or virtual) of the protected computing systems to create consistent point-in-time snapshots in the platform's repository. In preferred embodiments, application consistent images are created. E.g., in the case of Microsoft Windows platforms, the Microsoft Volume Shadow Copy Service, VSS, may be used.

In preferred embodiments, the replication mechanism includes a method of throttling its resource utilization on the protected computing system. This minimizes the impact of replication on the protected computing system.

In a preferred embodiment, replicated data is transmitted to the repository of an HA platform. In some embodiments, a software agent on the protected computing system monitors Quality of Service parameters. The agent may throttle replication to ensure sufficient resources are available for the protected computing system to perform its other tasks, such as running production applications. Quality of Service parameters preferably include CPU, disk, memory and network utilization. Additional Quality of Service parameters are possible, including parameters based on the performance of applications (preferably a configurable list of particular applications) running on the protected computing system. Such Quality of Service parameters allow the throttling mechanism to respond directly to the performance of the applications running on the protected computing system.

Preferred embodiments provide a method for incremental replication to replicate changes in the protected computing system that occur after an initial replication. Incremental replication is generally more efficient and has a lesser impact on the protected computing system than full replication. Some embodiments of the invention may vary in how incremental replication is provided in the same way that they may vary with respect to replication in general, discussed above.

Platforms preferably provide a repository in which the replicated content from the protected computing system is stored. The replicated content may be de-duplicated. In a preferred embodiment, the content is de-duplicated by calculating a cryptographic checksum, such as MD5, of data within a file on a per file basis, and using that checksum to index the content of the repository. If two data files result in the same cryptographic checksum, only one copy of the data is stored in the repository. De-duplications can be applied to a particular snapshot, to snapshots from a particular protected computing system, or, preferably, to all snapshots in the repository.

As an example, a repository may include a directory structure in which the data files are named by their cryptographic checksum and are in subdirectories that are named by some substring of the data file name, such as the first several characters of the file name.

Large data files may be de-duplicated in the repository on a block by block basis as opposed to a per file basis. This efficiently supports storage of large database files and other files in which large portions of the data are unchanged over time. The block size for de-duplication may be dynamic based upon considerations such as file type and historical trends in file modifications.

Data in a repository may be stored in a compressed format to optimize storage capacity. In a preferred implementation, file types known to be poor candidates for compression are not compressed. For example: zip and jpeg files. The process of compression and the calculation of checksums may be performed in parallel. The results of compressing an initial chunk of data from the file may be used to determine whether compression of the file is sufficient to warrant the expenditure of CPU cycles for the compression process. In some embodiments, if the compression results of the initial chunk of file data are below a configurable threshold, the compression process is aborted and instead uncompressed data is stored in the repository.

In preferred embodiments, platforms have means, such as software or hardware modules, for creating a content manifest that maps the de-duplicated cryptographic index to the original file name. These means include software modules that can alter de-duplication, can be integrated into de-duplication, software modules that can be invoked by other modules such as a module might use available indexing tasks or may apply known algorithms. Such means include hardware or software modules that implement known algorithms for indexing and correlating files. In some embodiments the means may be provided, or substantially provided, by generally available software modules. The manifest also contains or references metadata such as access control, modification times, security mechanisms, and other characteristics and metadata associated with the data files. In some embodiments it contains or references all such characteristics and metadata. An illustrative example of such a manifest is shown in FIG. 3A and FIG. 3B. FIG. 4 shows a sample manifest. JavaScript Object Notation (JSON) is used. The permissions are encoded properly for Windows. A complete manifest will contain a "before" state of { } for every entry.

The repository may also contain historical data and historical manifests. This allows for the reproduction of the historical content of a protected computer system. In preferred embodiments, the system can generate delta manifests, which are the differences between at least two manifests. FIG. 5A and FIG. 5B contains an illustrative example of a delta manifest.

Platforms preferably provide a method of creating a virtual machine image from the repository such that the virtual machine image recreates an instance of a previously replicated protected computing system. In some platform embodiments, virtual machine images are created as each computing system is replicated in the repository. This can be done by using an existing standard virtual machine to run a client/server agent which accepts requests to write data from the repository into a new virtual disk. The resulting virtual disk is a duplicate of the disk from the protected computing system as imaged in the repository. After the virtual disk is created, a process then modifies the contents of the virtual disk as required to make it boot and run as a virtual machine. For example, in the case of a Microsoft Windows image, this includes modifying registry entries to account for any differences between the hardware of the protected computing system and the hardware of the newly created virtual computing system.

In preferred embodiments, the delta manifests can be used to provide a fast method of creating a virtual image corresponding to any desired snapshot in time by using the client/server agent as described above and applying the changes called for in successive delta manifests to create an image representing an earlier state. An embodiment of this process can be denoted mathematically as follows:

a. A full manifest at time t for a specific protected system P is denoted as $M_t(P)$. The delta manifest is denoted by $D_t^{t-1}(P)$ and is the information needed to transition between $M_t(P)$ and $M_{t-1}(P)$. The information in the delta must be sufficient for the transition to be reversible, i.e., to enable deriving $M_{t-1}(P)$ from $M_t(P)$.

b. In order to create the full manifest at time t-n from a manifest at time t, we can apply multiple delta manifest transformations: $M_{t-n}(P) = D_{t-n}^{t-n+1}(P) \ldots D_{t-2}^{t-1}(P) D_{t-1}^{t}(P) M_t(P)$.

In further preferred embodiments, delta manifests can be used to create a virtual machine image corresponding to any snapshot in time by starting with an existing image and incrementally changing the contents of the virtual machine image. This allows for fast creation of any snapshot in time from the most recent virtual machine image.

Embodiments of platforms may include methods of monitoring the health of a protected computing system. Embodiments of HA platforms preferably include such methods. Preferably, the parameters indicating what is to be monitored and the criteria for determining a computing system failure are specified on a per system basis so that different protected computing systems may have different standards of health. In further preferred embodiments, the health of a protected computing system is assessed by evaluating the state of its hardware or by evaluating the applications running on it.

Embodiments of DR platforms preferably include methods of monitoring the health of a primary production site. The parameters for monitoring and the criteria for determining a primary site may be specified on a per site basis. For example, a parameter of 'responds to telephone call' may not be appropriate for a site with no telephones or with no people present. If the parameter is 'percentage of protected computing systems at the site that are running' then the criteria may be different if the site is known to have extra computing systems or be in the midst of planned outages.

Platforms may provide a method of running a virtual machine image when the health monitoring detects a failure of a protected computing system. This is a preferred feature of HA platforms. In a preferred implementation, the most recent image is automatically started when health monitoring determines a failure.

In some embodiments, there is a method to allow images other than the most recent image to be started when failure occurs. This method by be used, for example, by an operator to specify an image that is not known to cause failure or by another system or process that requires an image other than the most recent image.

In some embodiments, a replication method as described above replicates the contents of a virtual machine running on a platform as described above. The running image is considered as the protected computing system. In a preferred implementation, the platform running the replication method may be the same or different from the platform running the virtual machine image that is being replicated.

Preferred embodiments of DR platforms include a method of running on a platform one or more images of one or more protected computing systems when health monitoring of a primary production site detects a failure. Preferably, a DR platform can run images for all of the protected computing systems at a failed production site. In some embodiments, this method includes a way of alerting operators and requiring operator confirmation before starting workloads at the DR site. Alerting methods include telephone calls, text messages, emails, website notifications, and other electronic means of notification. Embodiments of HA platforms may also include alerting functionality.

Preferred embodiments may include a method for replicating the manifests and other contents of a platform's repository to one or more remote repositories on a DR platform. In some embodiments, this replication method is similar to that described above. The replication method preferably includes means to specify and enforce limits to bandwidth utilisation during the replication process. Preferred embodiments also include a similar method that allows replicating the contents of all or part of the remote repository to a new or existing HA platform. From the HA platform, the contents of that repository can be used to restore or recreate a protected local machine as described above.

In preferred embodiments, platforms include a method of displaying a list of the contents of a snapshot of a protected computing system at any point in time and allowing an operator to retrieve the contents of a file, set of files, or directories from a repository. This method can be used to restore particular data to protected computing systems without reverting to the complete snapshot. Preferred embodiments of DR platforms include the ability to do this from a remote repository.

Preferred platform embodiments include a method of restoring a snapshot of an original protected computing system from the repository to a target protected computing system. The target protected computing system may be distinct from the original or may be the same. In some embodiments, a software agent is installed on the target machine to enable it to receive data from the repository. This agent receives data from the repository and restore it to the local computing system, much as a standard network restore system. It may optionally update only changes to the content from some point in time based on delta manifests, or it can update the entire contents of a full manifest. The manifests and data can be either snapshots from an original protected computing system, or may be snapshots from a virtual machine image that has been started due to the failure of a protected computing system. Preferred embodiments of DR platforms include a method to do this when the repository is remote.

In some embodiments, platforms include a method of specifying and executing scripts that may be required to reconfigure virtual machine images and perform configuration of other infrastructure components such as network devices, directory services, etc. This is preferred in DR platforms.

Preferred embodiments include a method of replicating the contents of a remote repository to additional remote platforms for added redundancy. This may be done by replicating from a single HA platform to additional DR platforms or by replicating from an HA platform to a DR platform and from that DR platform to additional DR platforms. In some embodiments the additional DR platforms include platforms that are remote from each other. In some embodiments the DR platforms are local to each other but remote from the HA platform.

Some embodiments include a method allowing more than one local repository to be replicated to a remote repository. This is particularly useful for service providers and facilities with multiple branch offices, where HA is provided locally but DR may be centrally provided.

Closing Comments

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semiclosed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A process for virtualization of a protected system P comprising:
   a cyclical replication process comprising, in sequence:
      creating a consistent point-in-time snapshot of a protected system at a time t,
      creating a content manifest of the snapshot $M_t(P)$, the content manifest comprising metadata including modification times and security mechanisms for the snapshot,
      generating a delta manifest $D_t^{t-1}(P)$ comprising a set of information needed to transition between $M_t(P)$ and $M_{t-1}(P)$, wherein the set of information is sufficient to enable deriving $M_{t-1}(P)$ from $M_t(P)$,
      transmitting the delta manifest $D_t^{t-1}(P)$ to a repository; and
      enabling access to the point-in-time snapshot and the delta manifest $D_t^{t-1}(P)$ in order to create an operable image of the protected system P in a virtual machine distinct from the protected system P.

2. The process of claim 1 further comprising creating backup virtual disks V at a platform remote from the protected system P, the platform comprising the repository:
   creating an initial virtual disk $V_{t-n}$ in the repository,
   periodically receiving the delta manifests $D_t^{t-1}(P)$ and in response creating a new virtual disk $V_t$ by applying the delta manifest $D_t^{t-1}(P)$ to the prior virtual disk $V_{t-1}$.

3. The process of claim 1 further comprising recreating a desired snapshot $M_{t-n}(P)$ created at a time t−n, the process comprising:
   applying multiple delta manifest transformations to the most recent content manifest $M_t(P)$ according to $M_{t-n}(P)=D_{t-n}^{t-n+1}(P) \ldots D_{t-2}^{t-1}(P)D_{t-1}^{t}(P)M_t(P)$.

4. The process of claim 2 further comprising recreating backup virtual disks $V_{t-n}$ created at a time t−n, the process comprising:
   applying multiple delta manifest transformations to the most recent virtual disk $V_t$ to create $V_{t-n}$ as $V_{t-n}(P)=D_{t-n}^{t-n+1}(P) \ldots D_{t-2}^{t-1}(P)D_{t-1}^{t}(P)V_t(P)$.

5. The process of claim 1 further comprising recreating a desired snapshot $M_{t-n}(P)$ created at a time t-in, the process comprising:
   applying multiple delta manifest transformations to the most recent content manifest $M_t(P)$ according to $M_{t-n}(P)=D_{t-n}^{t-n+1}(P) \ldots D_{t-2}^{t-1}(P)D_{t-1}^{t}(P)M_t(P)$.

6. The process of claim 1 wherein the operable image is bootable on the virtual machine, the virtual machine suitable for use as a replacement for the protected machine P.

7. The process of claim 6 wherein the virtual machine is capable of operating on a high availability platform.

8. The process of claim 6 wherein the operable image is capable of operating in place of the protected machine P until such time as the protected machine P may be restored from the point-in-time snapshot and one of the delta manifests.

9. The process of claim 1 further comprising the steps of:
   transmitting the point-in-time snapshot and each of the delta manifests to a repository; and
   recreating the protected machine P from the point-in-time snapshot and at least one of the delta manifests after failure of the protected machine P.

10. Apparatus for virtualization of a protected system P, the apparatus comprising:
    a processor; and
    a memory,
    wherein the processor and the memory comprise circuits and software for performing a cyclical replication process comprising, in sequence:
       creating a consistent point-in-time snapshot of a protected system at a time t,
       creating a content manifest of the snapshot $M_t(P)$), the content manifest comprising metadata including modification times and security mechanisms for the snapshot,
       generating a delta manifest $D_t^{t-1}(P)$ comprising a set of information needed to transition between $M_t(P)$ and $M_{t-1}(P)$, wherein the set of information is sufficient to enable deriving $M_{t-1}(P)$ from $M_t(P)$, and
       transmitting the delta manifest $D_t^{t-1}(P)$ to a repository,
    wherein the processor and the memory comprise circuits and software for enabling access to the point-in-time snapshot and the delta manifest $D_t^{t-1}(P)$ in order to create an operable image of the protected system P in a virtual machine distinct from the protected system P.

11. The apparatus of claim 10 further comprising a platform remote from the protected system P, the platform for creating backup virtual disks V and comprising:
    the repository;
    a processor; and
    a memory,
    wherein the processor and the memory comprise circuits and software for, in sequence:
       creating an initial virtual disk $V_{t-n}$ in the repository, and
       periodically receiving the delta manifests $D_t^{t-1}(P)$ and in response creating a new virtual disk $V_t$ by applying the delta manifest $D_t^{t-1}(P)$ to the prior virtual disk $V_{t-1}$.

12. The apparatus of claim 10 wherein the operable image is bootable on the virtual machine, the virtual machine suitable for use as a replacement for the protected machine P.

13. The apparatus of claim 10 wherein the processor and the memory comprise circuits and software further for:
    transmitting the point-in-time snapshot and each of the delta manifests to a repository; and
    recreating the protected machine P from the point-in-time snapshot and at least one of the delta manifests after failure of the protected machine P.

14. The apparatus of claim 12 wherein the virtual machine is capable of operating on a high availability platform.

15. The apparatus of claim 12 wherein the operable image is capable of operating in place of the protected machine P until such time as the protected machine P may be restored from the point-in-time snapshot and one of the delta manifests.

16. A process for virtualization of a plurality of protected systems, each protected system P, comprising:
    A cyclical replication process for each protected system P comprising, in sequence:
       creating a plurality of consistent point-in-time snapshots, one for each of the protected systems P at a time t, creating a content manifest for each of the snapshots $M_t(P)$, each of the content manifests comprising metadata including modification times and security mechanisms for each of the snapshots, generating a delta manifest $D_t^{t-1}(P)$ for each of the snapshots comprising a set of information needed to transition between $M_t(P)$ and $M_{t-1}(P)$, wherein the set of information is sufficient to enable deriving $M_{t-1}(P)$ from $M_t(P)$, and transmitting each delta manifest $D_t^{t-1}(P)$ to a single repository; and enabling access to the point-in-time snapshots and the delta manifests $D_t^{t-1}(P)$ in order to create operable images of each of the protected systems in a plurality of virtual machines.

17. The apparatus of claim 16 wherein the operable images are bootable the virtual machines, the virtual machines suitable for use as replacements for the protected machines P.

18. The apparatus of claim 16 wherein a plurality of the virtual machines are capable of operating on a high availability platform.

19. The apparatus of claim 16 wherein the operable images are capable of operating in place of the protected machines P until such time as the protected machines P may be restored from the point-in-time snapshots and the delta manifests.

* * * * *